United States Patent [19]
Andersson

[11] Patent Number: 5,199,269
[45] Date of Patent: Apr. 6, 1993

[54] PELLETISER AND METHOD FOR MAKING FROZEN PELLETS

[75] Inventor: Alvar Andersson, Viken, Sweden

[73] Assignee: Frigoscandia Food Process Systems Aktiebolag, Helsingborg, Sweden

[21] Appl. No.: 613,531

[22] PCT Filed: May 17, 1989

[86] PCT No.: PCT/SE89/00268
§ 371 Date: Nov. 19, 1990
§ 102(e) Date: Nov. 19, 1990

[87] PCT Pub. No.: WO89/11228
PCT Pub. Date: Nov. 30, 1989

[30] Foreign Application Priority Data
May 18, 1988 [SE] Sweden ................. 8801850

[51] Int. Cl.⁵ ............ F25D 13/06; A23G 9/00; F25C 1/00
[52] U.S. Cl. ............................ 62/63; 62/75; 62/345; 62/346; 425/237
[58] Field of Search .......... 62/63, 71, 74, 75, 320, 62/345, 346, 356, 374, 340, 341; 425/233, 237, 262, 263

[56] References Cited

U.S. PATENT DOCUMENTS

| | | |
|---|---|---|
| 607,776 | 7/1898 | Rankin . |
| 2,224,430 | 12/1940 | Garbutt .................. 425/237 X |
| 2,616,271 | 11/1952 | Knowles .................... 62/345 |
| 2,651,922 | 9/1953 | Graham .................. 62/75 X |
| 3,193,377 | 7/1965 | Guseman et al. ......... 425/237 X |
| 3,287,926 | 11/1966 | Hall ........................ 62/356 X |
| 3,436,927 | 4/1969 | Gruber .................... 62/345 X |
| 3,762,181 | 10/1973 | Leidig ..................... 62/345 X |
| 4,051,208 | 9/1977 | Jaccard .................... 62/345 X |
| 4,212,609 | 7/1980 | Fay ......................... 425/362 X |
| 4,761,962 | 9/1988 | Andersson . |
| 4,914,927 | 4/1990 | Miller et al. ............. 62/346 X |
| 5,049,333 | 9/1991 | Wolfe et al. .............. 425/363 X |

FOREIGN PATENT DOCUMENTS

| | | | |
|---|---|---|---|
| 213035 | 8/1955 | Australia ................... 425/237 |
| 599421 | 7/1934 | Sweden . | |
| 453554 | 2/1988 | Sweden . | |
| 752954 | 7/1956 | United Kingdom ........ 425/237 |
| 814970 | 6/1959 | United Kingdom ........ 425/237 |

Primary Examiner—Henry A. Bennet
Assistant Examiner—Christopher Kilner
Attorney, Agent, or Firm—Browdy & Neimark

[57] ABSTRACT

A pelletizer for making pellets from a liquid or semi-liquid food product has two molding rolls between which the food product is formed into pellets. The rolls have teeth of complementary shape, and the teeth of at least one roll have axially spaced apart recesses. The rolls are cooled with a refrigerant during the molding operation. By the means of the pelletizer, frozen pellets are made from a liquid or semi-liquid food product which, prior to molding, is refrigerated into moldable consistency before being supplied to the nip between the two cooperating molding rolls which are cooled during the molding operation so as to form surface-frozen pellets which are thereafter subjected to final freezing.

6 Claims, 5 Drawing Sheets

PELLETISER AND METHOD FOR MAKING FROZEN PELLETS

The present invention relates to a pelletizer for making pellets from a liquid or semiliquid food product which has been refrigerated into moldable consistency, said pelletizer having two molding rolls between which the refrigerated food product is formed into pellets.

The invention also relates to a method for making frozen pellets from a liquid or semiliquid food product.

The freezing of liquid or semiliquid food products in particle form, i.e. in the form of powders, granules, pellets or the like, confers advantages in several respects. Thus, quick freezing, as well as quick thawing, is made possible, which is advantageous for high quality. Freezing in particle form enables the producer to simplify packaging in portions of different sizes, while the consumer need only thaw the amount of food required on a particular occasion.

For freezing liquid and semiliquid food products in the form of pellets, it is previously known to first freeze the product in block form and then divide the frozen blocks into particles which are smaller than the desired pellets, and thereafter compress the particles to form pellets of the desired shape. The major drawback of this method is that it is not sufficiently gentle on many products containing components in particle form. These components may then be damaged, both during disintegration and compression.

Another method for freezing food products as defined above in the form of pellets consists in freezing the food product in containers of desired shape and volume, and expelling the food product from the containers after freezing. This method is complicated from production engineering aspects and also suffers from the disadvantage that it is difficult to prevent the product from freezing fast in the containers.

Yet another method for freezing food products as defined above in pellet form involves spreading the product on a conveyor belt which may be planar, corrugated or provided with depressions of a desired shape. The product spread on the belt is conducted thereon through a freezing zone and, after passing through this zone, is separated from the belt. This method suffers essentially from the same drawbacks as the method previously described.

It is further known, by resorting to substantial compression, to make pellets of optional materials which have been finely divided prior to compression. This technique however conditions that the components of material in the pellets produced are not adversely affected by the required, relatively high degree of compression.

The object of the present invention therefore is to provide a pelletizer of the type stated in the introduction to this specification, which is able to make pellets without any of the shortcomings encountered in prior art techniques.

According to the invention, a pelletizer of the type stated by way of introduction is characterized by a refrigerator for cooling at least one molding roll so as to bring about surface freezing of the food product during molding thereof into pellets.

The molding rolls suitably have teeth of complementary shape, and the teeth of at least one roll have axially spaced-apart recesses. In a preferred embodiment, the teeth of both rolls have recesses, the centre distance of which on each roll is at least equal to the axial width of the recesses, the recesses of one roll being axially located midway between the recesses of the other roll. The profile of the two rolls then is suitably identical.

The recesses may advantageously have an undulating profile in an axial section of the teeth, and the teeth, may further have a rounded shape, such that the molded pellets will have a double saddle shape. To facilitate the removal of the molded pellets from the recesses, these suitably extend throughout the entire tooth width in the circumferential direction and may be provided by turning.

According to the invention, the method for making frozen pellets from a liquid or semiliquid food product is characterized by refrigerating the food product into moldable consistency, feeding the moldable food product into the nip between two cooperating molding rolls, cooling the molding rolls during the molding operation so as to form surface-frozen pellets, and thereafter subjecting the pellets to final freezing.

Suitably, the cooling of the molding rolls is so adjusted that the molded pellets are completely enclosed by a frozen crust.

The refrigerator of the pelletizer preferably is arranged to cool both molding rolls, suitably by means of a refrigerant which is supplied to a cavity in each roll. The cavity may advantageously be cylindrical, and the refrigerant, e.g. liquid nitrogen, can be injected through a nozzle provided in the cavity.

The invention will now be described in more detail hereinbelow with reference to the accompanying drawings.

FIG. 1 schematically shows an embodiment of a refrigerating device in which the inventive pelletizer is included.

Figure 1:
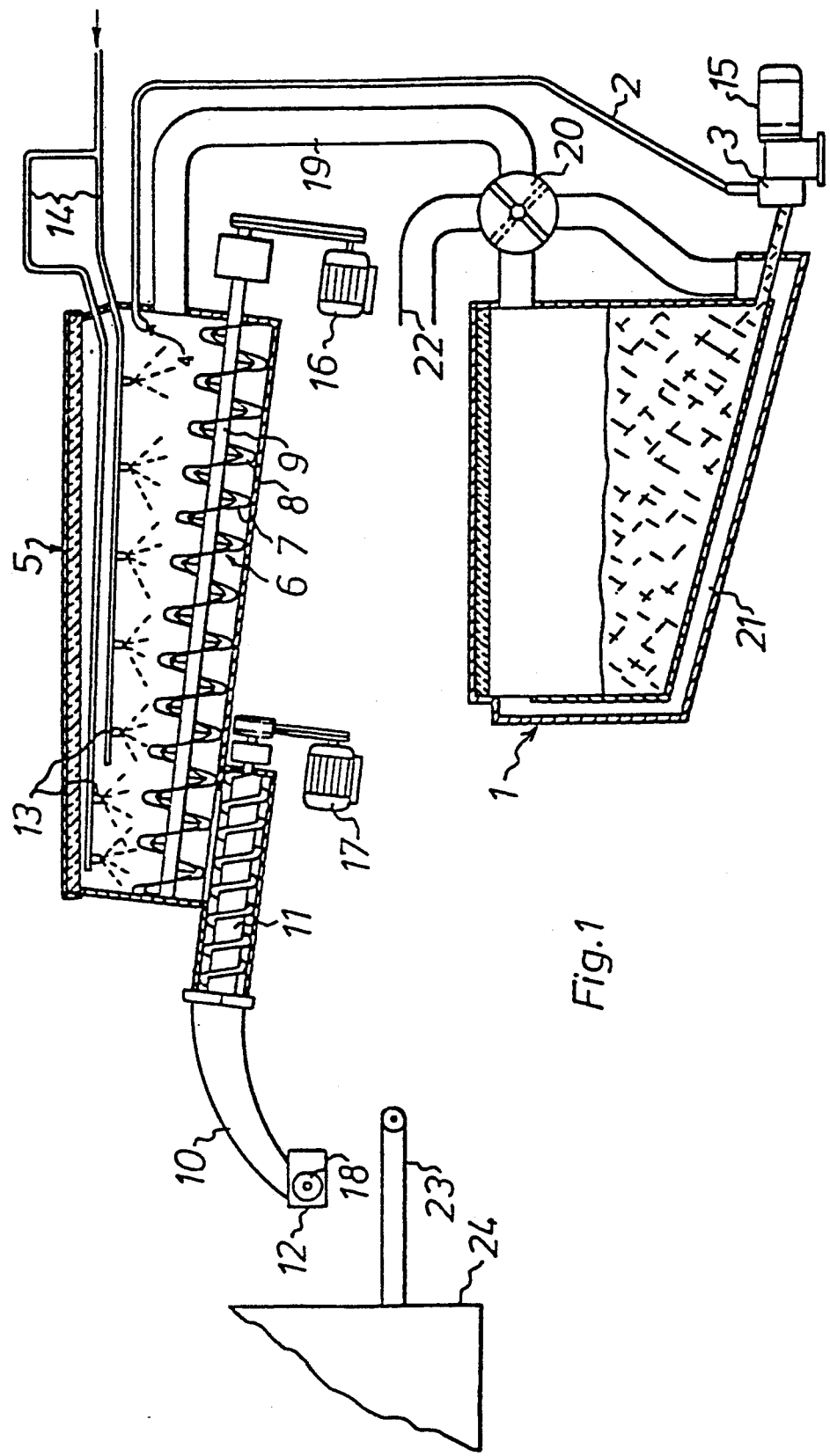

In FIG. 1, there is shown a container 1 for a liquid or semiliquid product to be frozen in pellet form. The product in the container 1 can be discharged therefrom through a conduit 2 by means of a pump 3. The conduit 2 is connected to a nozzle 4 from which the product is caused to drop or flow down into one end of a second insulated container 5 having an agitator and a conveyor 6. The container 5 is elongate and accomodates a screw conveyor 7 extending in the longitudinal direction of the container 5 from an inlet end thereof at the nozzle 4 to an opposite outlet end. The screw conveyor 7 has at least one screw flight 8 mounted on a central drive shaft 9 in spaced-apart relation thereto, such that it also serves as agitator. The screw conveyor may advantageously include two parallel screws, each comprising one screw flight.

At the outlet end of the container 5, an opening is provided in the bottom of the container 5. In a discharge conduit 10 connected to this opening, a screw conveyor 11 is mounted for feeding the product concerned through the discharge conduit 10 to a pelletizer 12 mounted at the outer end of the discharge conduit.

In the upper part of the container 5, there are mounted a plurality of spray nozzles 13 which via conduits 14 can be supplied with a refrigerating gas in the liquid state, preferably liquid nitrogen. The nozzles 13 are such that the liquid refrigerating gas is sprayed in a very finely divided state over the product fed into the container 5.

Further, electric motors 15, 16, 17 and 18 are provided for driving the pump 3, the agitator and the conveyor 6, the screw conveyor 11 and the pelletizer 12, respectively. The excess of refrigerating gas in the container 5 is conducted through a conduit 19 and a throttle valve 20, either into a gap 21, which covers at least the underside of the container 1, and from there into the container 1, or to an outlet 22.

The arrangement described above operates as follows. The liquid or semiliquid precooled product is pumped by means of the pump 3 from the container 1 to the nozzle 4 and into the container 5. In the container 5, the product supplied is agitated while the liquid refrigerating gas is sprayed over it in a freezing zone between the inlet end and the outlet end of the container 5. Very small droplets of the liquid refrigerating gas will thus be distributed over the surface of the product in the agitator and the conveyor 6, providing quick and gentle freezing of the product. The simultaneous agitation of the product prevents the formation of too large ice crystals in the product, i.e. the fluidity of the product decreases as the product is conveyed slowly through the agitator and the conveyor 8. The refrigerating gas, passing into gaseous form when contacting the product, flows through the conduit 19 and the throttle valve 20 down into the gap 21 and from there into the container 1 for precooling the product contained therein.

By suitably controlling the feeding speed of the conveyor screw 7 and the amount of refrigerating gas supplied in liquid form, it is possible to impart to the food product concerned the required moldability at the outlet ed of the conveyor 6. From the outlet end, the moldable food product is then fed by the screw conveyor 11 through the discharge conduit 10 to the pelletizer 12. This drops the molded pellets onto a conveyor 23 which conveys the food product in pellet form into a freezer 24 for final freezing.

The required moldability is such that the molded pellets will essentially retain their shape during the transport on the conveyor belt 23 into the freezer 24.

Figure 2:
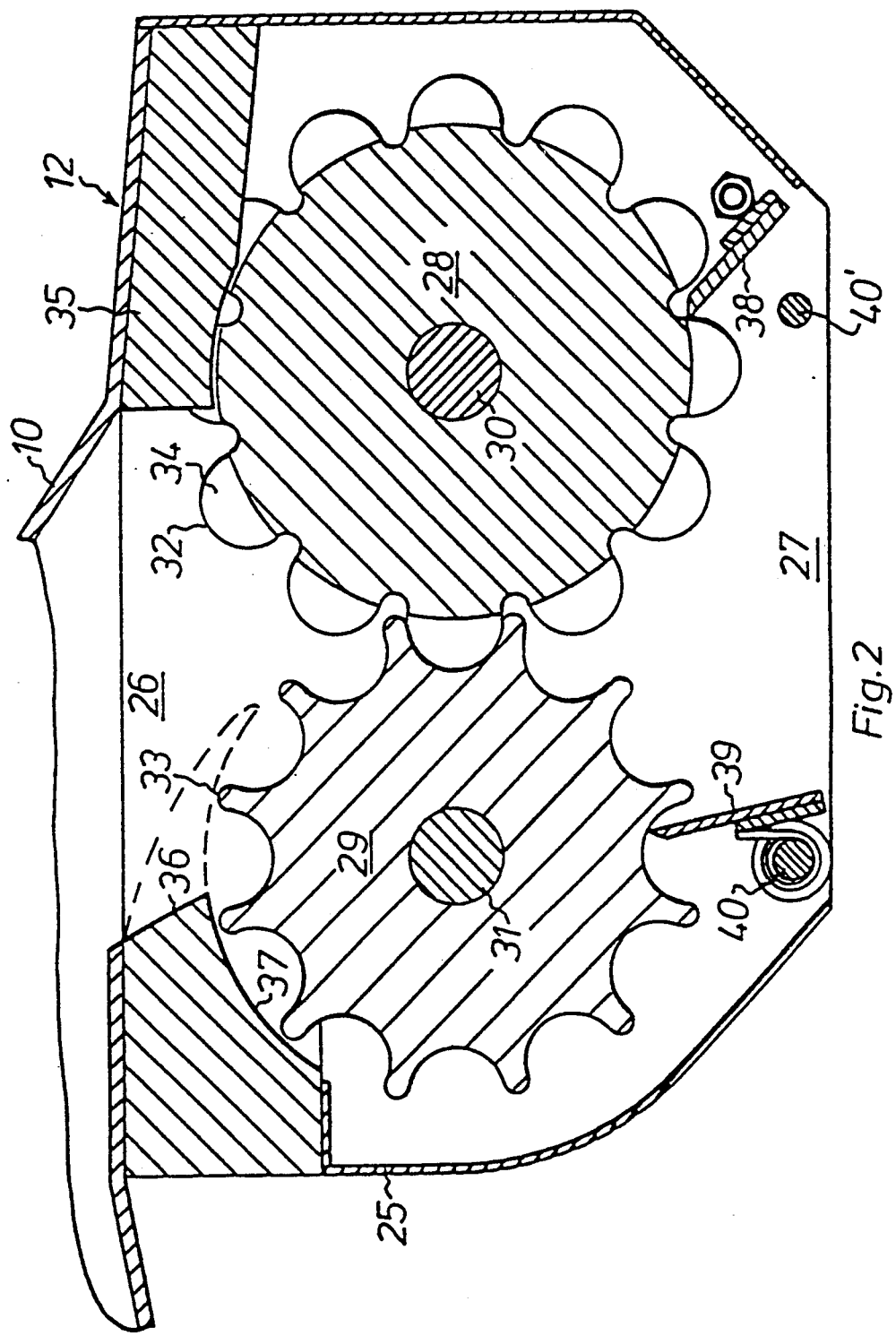
FIG. 2 is a side view in cross-section of an embodiment of the pelletizer according to the invention.

The pelletizer 12, shown in more detail in FIG. 2, is mounted on the outer end of the discharge conduit 10 and consists of a substantially parallelepepidal housing 25 provided in its top side with an inlet opening 26 to which the discharge conduit 10 is connected, and an outlet opening 27 in its bottom side. Within the housing 25, two rolls 28 and 29 are mounted for simultaneous rotation while engaging each other. More specifically, the rolls 28 and 29 have teeth of a complementary shape and are mounted on shafts 30, 31 in such a spaced-apart relationship that the teeth 32 and 33 of the rolls 28 and 29, respectively, mesh with each other when the rolls 28, 29 are rotated by means of the motor 18 (not shown in FIG. 2).

In the embodiment of the pelletizer according to the invention shown in FIG. 2, the teeth 32 of the roll 28 are considerably wider than the teeth 33 of the roll 29. The teeth 32 are further formed with axially spaced-apart recesses 34. The shape of these recesses appears more clearly from FIG. 3. In a longitudinal section of the roll 28, the recesses 34 thus are arcuate, e.g. circular-arc shaped. Their depth is smaller than the height of the teeth 32, and their centre distance in the axial direction is at least equal to the axial width of the recesses 34.

The teeth 33 of the roll 29 may be formed by milling. The teeth 32 of the roll 28 may also be provided by milling, whereupon the recesses 34 can be formed by turning. These two working operations may also be performed in the reverse order.

For guiding the product supplied through the opening 26 in between the rolls 28, 29, two guide blocks 35, 36 are mounted in the housing 25 above the respective roll. The guide block 35 has a profile which is complementary to that of the roll 28 in FIG. 3, while the guide block 36 has a circular-arc shaped, concave surface 37, the radius of curvature of which substantially agrees with the maximum radius of the roll 29. Alternatively, the guide block may have the shape shown by dashed lines in FIG. 2.

The product fed through the opening 26 can thus pass through the pelletizer 12 only between the rolls 28, 29.

Below the roll 28, a doctor blade 38 is fixedly mounted. It has the same profile as the guide block 35. Below the roll 29, a doctor blade 39 is mounted on a shaft 40 and biased by a spring clockwise. The shaft 40 in turn is mounted on a shaft 40' and also biased by a spring clockwise. When the roll 29 rotates clockwise, the doctor blade 39 will thus follow the outer circumferential surface of the roll 29 as a cam.

Figure 3:
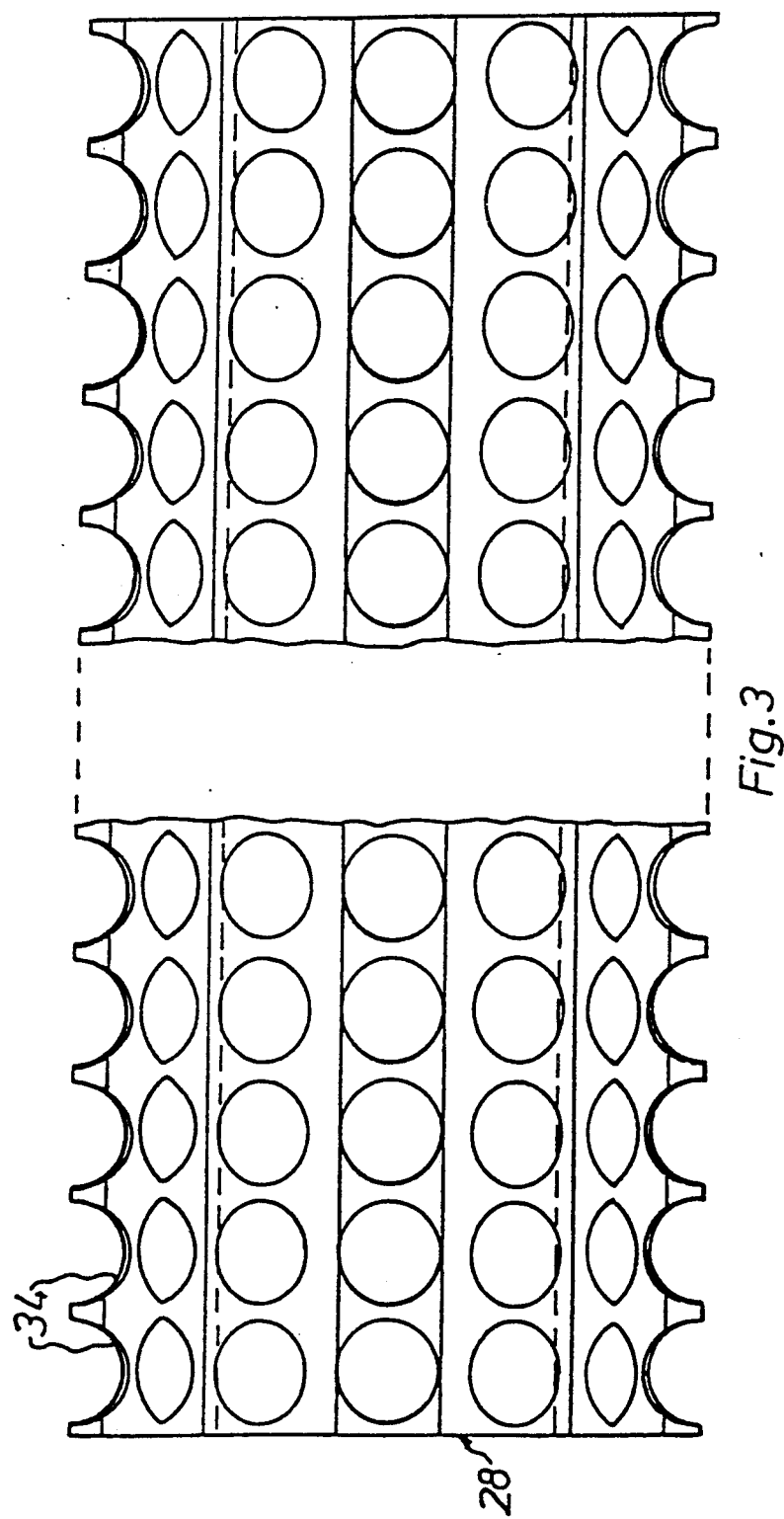
FIG. 3 is a top plan view of a first embodiment of the included in the pelletizer.

The pelletizer 12 shown in FIGS. 1-3 operates as follows. The product, plastically moldable by partial freezing and supplied through the opening 26, will fill the space above the rolls 28, 29 and between the guide blocks 35, 36. When the rolls 28, 29 rotate anticlockwise and clockwise, respectively, pellets will be molded from the product in the spaces which are formed by the almost complete closure of the recesses 34 by the roll 29, due to the cooperation between the teeth 32 of the roll 28 and the tooth gaps of the roll 29. The feed pressure should then be relatively high, such that the exposed recesses and tooth gaps are completely filled. The recesses 34 in the roll 28 are again exposed as the engagement between the tooth 32 on the roll 28 and the corresponding tooth gap on the roll 29 ceases. Thus, the resulting pellets will drop through the opening 27 onto the conveyor 23 for conveyance into the freezer, 24. The doctor blades 38 and 39 ensure that the molded pellets drop through the opening 27, preventing them from accompanying either of the rolls 28, 29 back to the inlet opening 26.

Figure 4:
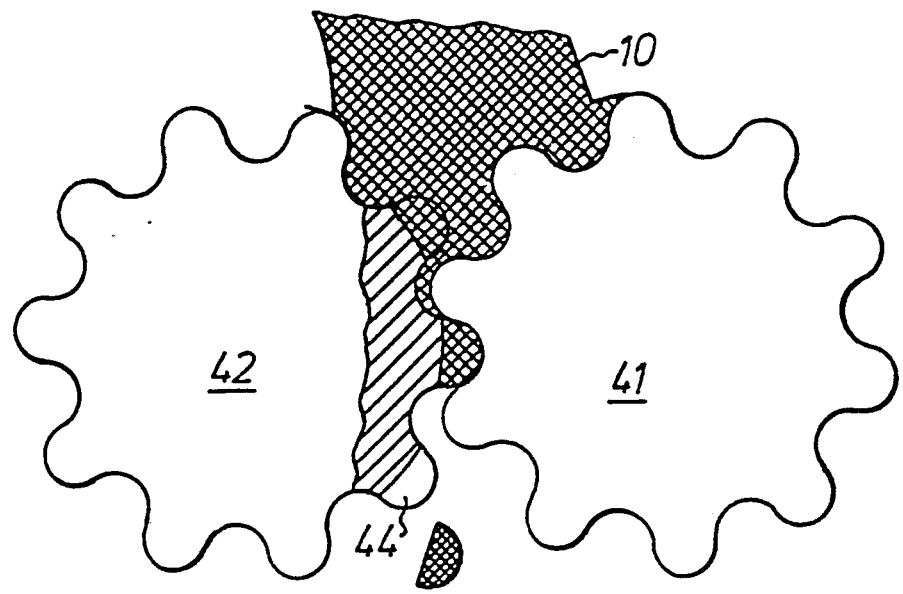
FIGS. 4 and 5 are a side view and a top plan view, respectively, of a second embodiment of the rolls included in the pelletizer
Figure 5:
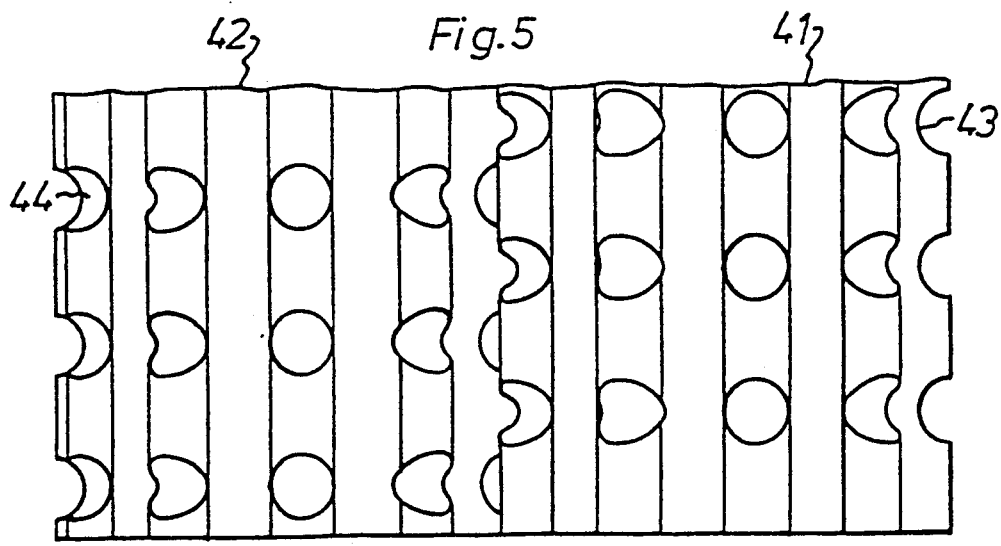

FIGS. 4 and 5 show an alternative design of rolls 41, 42 having teeth of identical profile. In this embodiment, the teeth of both rolls 41, 42 have recesses 43 and 44, respectively, the center distance of which on each roll is at least equal to the axial width of the recesses 43, 44. Further, the recesses 43 of one roll 41 are axially located midway between the recesses 44 of the roll 42. The area of the recesses 43 (like that of the recesses 34) suitably is larger than the area of the surface closing the recesses, thereby facilitating the release of the pellets from that surface. To the same end, the side walls of the recesses may closely join radial planes through the respective roll and may also have axial grooves which, suitably, are also formed by turning. The rolls 41 and 42 can also be manufactured by milling and turning, the recesses (as in the roll 28) extending throughout the entire tooth width.

It is evident that several different profiles are possible for the rolls included in the pelletizer. The teeth suitably have such a profile that they will slide relative to each other during meshing. The tooth height may advantageously also be reduced relative to the roll diameter, for instance be 1/10–1/20 thereof. It is also essential that the shape of the rolls is such that no substantial compression takes place of the plastically molded material to be formed into pellets.

Several modifications of the pelletizer described above are possible within the scope of the invention. Thus, the doctor blade 39 may be replaced by an axially extended wire which is caused to follow the outer circumferential surface of the roll 29. The roll length may also be varied from the diameter of the screw conveyor 11 up to the width of the conveyor 23.

In another embodiment of the rolls 41, 42, the recesses 43, 44 are deeper than the height of the teeth, and the teeth have such a shape that each recess 43, 44, in a certain position of rotation of the rolls 41, 42, is completely closed, with the exception only of the surface portion between adjacent recesses in the same radial plane, which is the result of the recess depth being larger than the height of the teeth.

When the polletizer is used for making partially frozen products, it may of course be combined with other types of freezers than that shown in FIG. 1. Further, it may advantageously be connected directly to the discharge end of the screw conveyor 11, without using any discharge conduit 10.

Figure 6:
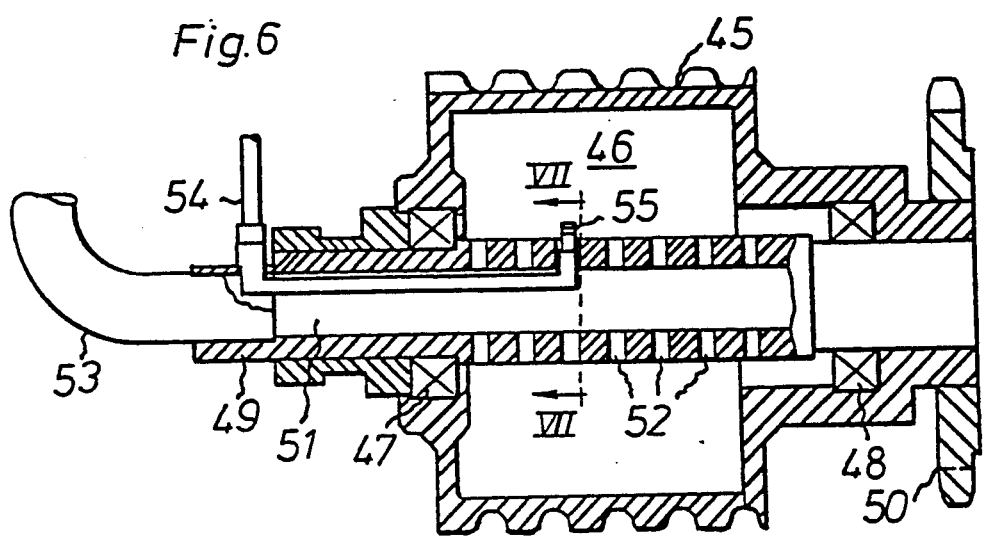
FIG. 6 is a longitudinal section of a preferred embodiment of one of the molding rolls of the pelletizer.
Figure 7:
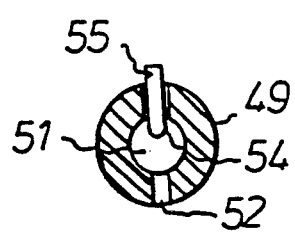
FIG. 7 is a cross-section taken along the line VII—VII in FIG. 6.

FIGS. 6 and 7 show the most preferred embodiment of the molding rolls in the pelletizer according to the present invention. These figures show only one roll 45, but the roll cooperating therewith is of identical design. The roll 45 has a cylindrical cavity 46 and is rotatably mounted on a fixed shaft 49 by means of bearings 47, 48. On the roll 45 there is fixedly mounted a sprocket 50, by means of which the roll 45 is rotated. From one end of the shaft 49 extends an axial bore 51 through the shaft and over the entire length of the cavity 46. Radial through holes 52 are provided in the shaft 49 within the extent of cavity 46. The holes 52 thus connect the cavity 46 to the bore 51. An outlet pipe 53 is connected to the open end of the bore 51. Further, a separate conduit 54 extends through the bore 51 and out through one of the holes 52 and is terminated in the cavity 46 by a nozzle 55.

During the operation of the pelletizer according to FIGS. 6 and 7, a refrigerating medium is supplied through the conduit 54 and sprayed through the nozzle 55 into the cavity 46 where it will thus cool the outer wall of the cavity 46 and, consequently, the teeth of the roll 45. The refrigerating medium, which suitably is liquid nitrogen, is then gasified and led through the openings 52 and the bore 51 out through the outlet pipe 53.

By means of the above-described embodiment of the molding roll 45 and the roll cooperating therewith, the food product, when being molded into pellets between the molding rolls, will be refrigerated to such an extent that the molded pellets will have a frozen crust of a thickness of one or a few millimetres, this facilitating the removal of the molded pellets from the molding rolls and ensuring that the molded pellets retain their shape. Final freezing of the molded pellets then suitably takes place, as previously described, in a separate freezer of optional type.

To obtain a suitable crust thickness of the molded pellets, the temperature of the molding roll 45 is suitably sensed by means of a suitable sensor, and the flow of refrigerant is fed through the conduit 54 into the cavity 46 depending on the temperature sensed, such that it is maintained at a value required for the desired crust thickness.

I claim:

1. A pelletizer for making pellets from a liquid or semi-liquid food product which has been refrigerated to a moldable consistency, said pelletizer comprising:

two facing, hollow molding rolls having slidingly intermeshing teeth of rounded complimentary shape;

said teeth of both rolls having axially spaced-apart recesses extending circumferentially throughout the entire width of each tooth, said recesses having an arcuate profile in a longitudinal section along an axis of said roll;

the center distance of spaced-apart recesses of each tooth being substantially equal to the axial width of said recesses, the recesses of one roll being axially located between the recesses of the other roll;

such that during rotation of said molding rolls, the recesses of each tooth define individual pellet-shaped and, once per revolution of each of said molding rolls, almost completely closed cavities; and further comprising freezing means for freezing the outer surface of said moldable consistency food product and simultaneously molding said food product into pellets without substantial compression thereof in said individual pellet-shaped recesses when said food product is fed between said rolls, said freezing means comprising a refrigerator and means for feeding a refrigerant from said refrigerator to the hollow interior of each of said hollow molding rolls.

2. Pelletizer as claimed in claim 1, wherein the radial depth of the recesses (43, 44) is larger than the height of the teeth.

3. A pelletizer in accordance with claim 1 wherein said hollow molding roll is rotatably mounted on a fixed shaft through a bore in which said refrigerant is fed into the hollow of said roll.

4. A pelletizer according to claim 1 further comprising, upstream of said two facing molding rolls, means for feeding said food product having a moldable consistency to said two facing molding rolls from means for simultaneously agitating and cooling a liquid or semi-liquid food product sufficient to effect quick and gentle freezing to thereby reduce the consistency of the liquid or semi-liquid food product to said moldable consistency while preventing the formation of large ice crystals.

5. A pelletizer according to claim 1 wherein said teeth also have an identical profile.

6. A pelletizer for making pellets from a liquid or semi-liquid food product, comprising:

means for simultaneously agitating and cooling a liquid or semi-liquid food product sufficient to reduce the consistency of the liquid or semi-liquid food product to a moldable consistency while preventing the formation of large ice crystals;

freezing and shaping means for freezing the surface of said moldable consistency food product and simultaneously molding said food product into pellets, said freezing and shaping means comprising two facing, hollow molding rolls having slidingly intermeshing spaced apart teeth of rounded complimentary shape extending entirely about both said rolls, said teeth extending substantially entirely across said rolls and having axially spaced-apart recesses extending across the entire width of each said tooth, said recesses having an arcuate profile in a longitudinal section along an axis of said roll;

the center distance of spaced-apart recesses of each tooth being substantially equal to the axial width of said recesses, the recesses of one roll being axially located between the recesses of the other roll;

said teeth and said recesses defining, during rotation of said molding rolls, a plurality of individual pellet-shaped and substantially completely closed cavities constituting means for forming said food product into pellets with no substantial compression thereof in said individual pellet-shaped recesses;

refrigeration means for cooling the hollow interior of each of said hollow molding rolls; and means for feeding said moldable consistency food product from said means for simultaneously agitating and cooling to said molding rolls.

* * * * *